(12) United States Patent
Stone

(10) Patent No.: US 9,347,371 B2
(45) Date of Patent: May 24, 2016

(54) INSTANT ENTROPY SYSTEM

(71) Applicant: iEntropia SpA, Santiago (CL)

(72) Inventor: Christopher S. Stone, Rio Bueno (CL)

(73) Assignee: iEntropia SPA, Santiago (CL)

( * ) Notice: Subject to any disclaimer, the term of this patent is extended or adjusted under 35 U.S.C. 154(b) by 52 days.

(21) Appl. No.: 14/203,905

(22) Filed: Mar. 11, 2014

(65) Prior Publication Data

US 2014/0265348 A1 Sep. 18, 2014

Related U.S. Application Data

(60) Provisional application No. 61/778,981, filed on Mar. 13, 2013.

(51) Int. Cl.
| | |
|---|---|
| F02B 63/04 | (2006.01) |
| F02B 45/08 | (2006.01) |
| F01B 11/02 | (2006.01) |
| F02B 71/00 | (2006.01) |
| F01B 11/00 | (2006.01) |

(52) U.S. Cl.
CPC .............. F02B 63/04 (2013.01); F01B 11/004 (2013.01); F01B 11/007 (2013.01); F01B 11/02 (2013.01); F02B 45/08 (2013.01); F02B 71/00 (2013.01); Y02T 10/34 (2013.01)

(58) Field of Classification Search
CPC ................................. F02B 63/04; F02B 53/14
USPC .......................................... 290/1 A; 123/3, 23
See application file for complete search history.

(56) References Cited

U.S. PATENT DOCUMENTS

| | | | | |
|---|---|---|---|---|
| 2,344,865 A | * | 3/1944 | Francisco | 123/41.02 |
| 6,030,526 A | * | 2/2000 | Porter | 210/198.1 |
| 2010/0236511 A1 | * | 9/2010 | Elkanick et al. | 123/1 A |
| 2012/0125288 A1 | * | 5/2012 | Simpson et al. | 123/27 R |

OTHER PUBLICATIONS

Felix-Rivera et al., "Triacetone triperoxide thermogravimetric study of vapor pressure and enthalpy of sublimation in 303-338K temperature range", Thermochimica Acta, 514, 37-43 (2011), Dec. 7, 2010.*
Dubnikova et al., "Decomposition of Triacetone Triperoxide Is an Entropic Explosion", Journal of the American Chemical Society, 127(4), 1146-1159 (2005), Jan. 5, 2005.*

* cited by examiner

*Primary Examiner* — Tulsidas C Patel
*Assistant Examiner* — Sean Gugger
(74) *Attorney, Agent, or Firm* — Merek, Blackmon & Voorhees, LLC

(57) ABSTRACT

The instant invention is to a new fuel system, which will allow operation of large scale electrical power generating facilities at a fraction of the cost of coal or natural gas fueled facilities and will not produce significant heat, exhaust emission gases, or particulate pollution. Because of the nature of the chemical reaction exploited in the system, it is denominated an instant entropy system ("IES"). The fuel used by the inventive IES produces gas expansion, but not from an oxidation/combustion reaction, and it does not produce oxidative exothermic heat. The IES utilizes a material first developed in the early part of the twentieth century—triacetone triperoxide (TAP).

17 Claims, 1 Drawing Sheet

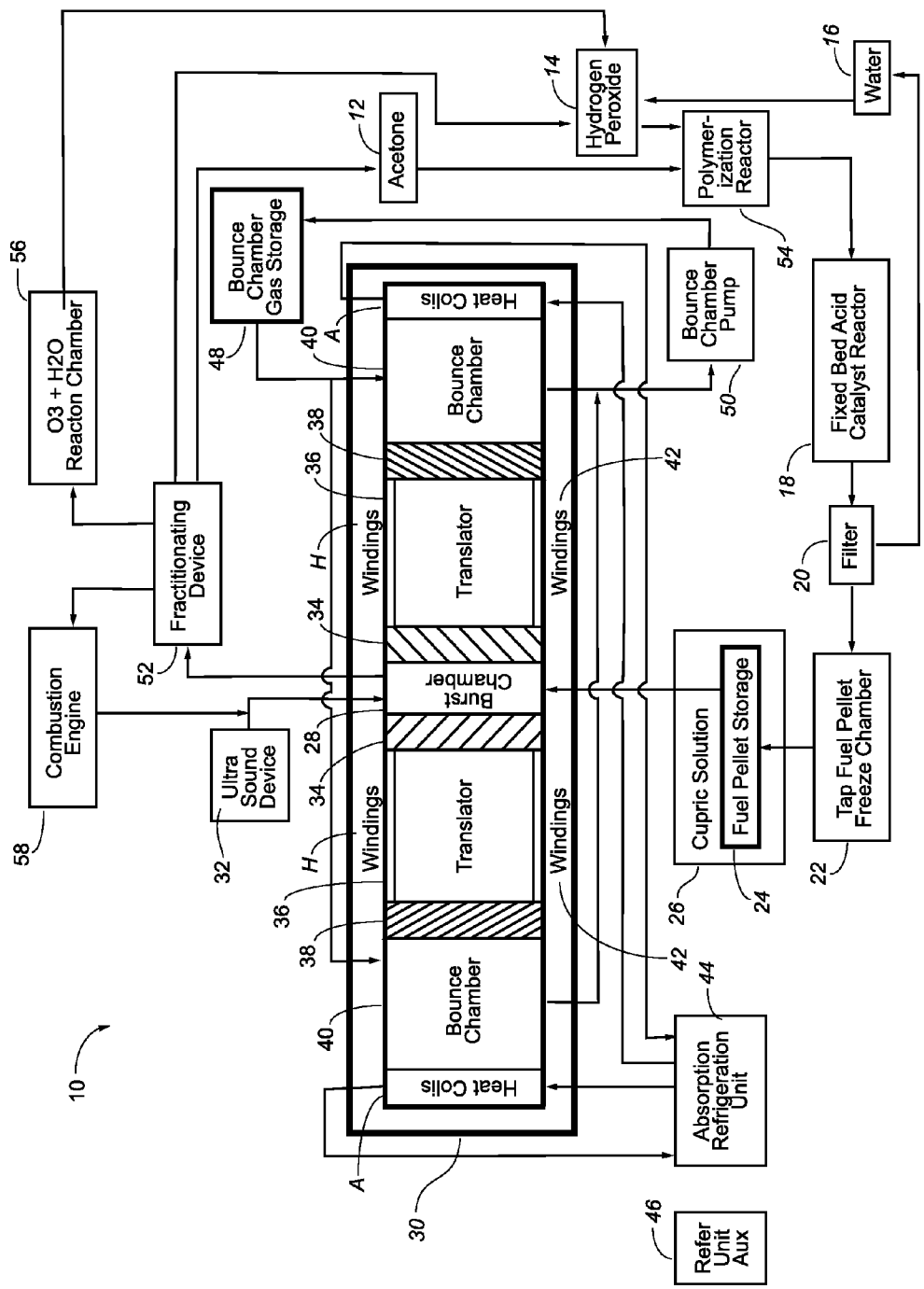

INSTANT ENTROPY SYSTEM

CROSS REFERENCES TO RELATED APPLICATIONS

This application claims the benefit of U.S. Provisional Application 61/778,981, filed Mar. 13, 2013, entitled Instant Entropy System, which is incorporated herein by reference.

BACKGROUND OF THE INVENTION

1. Field of the Invention

The present invention relates generally to electrical energy production and fuels for the same, and more particularly to an entropy burst fuel for use in electrical power generation facilities, and more particularly still to a system for using triacetone triperoxide pellets in an entropy burst generator for use in generating electricity.

2. Background Discussion

Modern society is based on (and largely depends on) the production of electricity from the combustion of carbon based fuels, principally coal and natural gas. These fuels are combusted/oxidized in central electrical power generation facilities that operate at fuel to electricity conversion efficiencies of less than 40%. The hot exhaust gases are typically scrubbed to remove gross pollutants and then vented to outside atmosphere.

Many believe that this consumption combined with the consumption of other petrochemical products used for transportation has significantly contributed to the increase in damaging climate cascade events. Indeed, this is controversial only in political and religious circle, but it is not controversial in scientific circles.

While there may remain some debate on the actual contribution of fossil fuel consumption to the phenomenon of global warming, there is no debate regarding the finite supply of these fuels or that the economically practicable extraction of such fuels will come to an end at some time. The consensus appears to be that economical access to electricity will likely diminish, and thus the growth of modern social trends will taper off or reverse. Alternative and ecologically friendly energy sources—wind, hydroelectric, alcohol, biofuels, tidal, geothermal, and solar—are limited in their scope and by their elevated cost. Nuclear energy remains controversial because of its dangers and long term ecological impact.

All carbonaceous fuels currently used in electrical energy production are combusted in an exothermic reaction that can be described by various heat cycle formulas. The solid or liquid (quasi-liquid for natural gas) fuels must first be vaporized then oxidized using atmospheric oxygen. Regardless of the initial state, liquid or solid, currently only carbon-based fuels provide the abundance and oxidative rate that will provide gas expansion, accompanied by heat loss, sufficient to power turbine or internal combustion engines. The efficiency of this conversion of energy is the general relationship of the oxidation/combustion efficiency factored in with the generator efficiency. While modern generators achieve efficiencies in excess of ninety percent (90%), oxidation/combustion work efficiencies rarely exceed forty percent (40%) with most of the loss attributed to heat.

Further, useful work is derived from the oxidation/combustion of these fuels only from the reacting gas expansion. The solid or liquid fuels are vaporized and then undergo deflagrative oxidation/combustion reactions forming through hundreds of reactive steps into a myriad of other gases, all the while releasing heat. This exothermic release of heat is the central factor in the loss of efficiency in all carbon based fuel combustion.

BRIEF SUMMARY OF THE INVENTION

The instant invention is a new fuel system, which will allow operation of large scale electrical power generating facilities at a fraction of the cost of coal or natural gas fueled facilities and will not produce significant heat, exhaust emission gases, or particulate pollution. Because of the nature of the chemical reaction exploited in the system, it is denominated an instant entropy system ("IES"). The fuel used by the inventive IES produces gas expansion, but not from an oxidation/combustion reaction, and it does not produce oxidative exothermic heat. The IES utilizes a material first developed in the early part of the twentieth century—triacetone triperoxide (TAP).

TAP is a crystalline solid with a gas expansion potential equal to 83% of the detonative force of TNT, by weight. TAP is commonly utilized as a terrorist weapon due to the ease of manufacture from readily available and inexpensive source materials: acetone, a common solvent, and hydrogen peroxide, a common bleach.

TAP was first authoritatively researched in a paper, "Decomposition of Triacetone Triperoxide is an Entropic Explosion," published in the Journal of the American Chemical Society, 2005. This paper was the result of a collaboration of universities from Germany, Israel, and independent research institutes in the USA. The above-identified paper named the TAP reaction an "entropy burst" ("EB").

TAP is a very unstable crystalline solid which undergoes an EB, detonative rate solid phase to gas phase reaction, at minimum energy input. Slight impact or vibration can initiate this EB reaction. The EB reaction is a cascade event involving a disassembly of the solid crystalline TAP lattice into gas molecules at a detonative reaction rate. Because EB is not an exothermic oxidative reaction the reactant gases formed are principally acetone and ozone. Other minor gases produced are ethane and methyl acetate. The gas phase ozone can be reacted with gas phase H2O to produce hydrogen peroxide, which can then be combined with the gas phase acetone produced by the EB reaction, cooled to the liquid phase, and reprocessed into TAP. There are material losses, but approximately 80% of the material originally used to form the TAP crystal can be recovered from the EB event and reformed into new TAP crystals. This remarkable characteristic gives rise to a principal advantage of the present invention.

To make TAP suitable for use in the IES, acetone (99%) and hydrogen peroxide (50%) are combined in a temperature controlled environment. This solution, polymerized acetone and water, is passed through a fixed bed acid catalyst, during which the solution temperature is held below 0° C. This is in contrast to the typical use of liquid acid catalyst. The TAP crystals are formed as the polymerized acetone contacts the solid acid catalyst resulting in solid TAP crystals in water. The water is removed using filtration such that the TAP volume is in a specific percentage relationship to the water. This percentage is dependent on the device to be driven, that is, whether turbine or internal combustion engine. The TAP solution is then cooled at a specific rate to control the water crystallization size, creating a frozen TAP fuel pellet. The frozen TAP fuel pellet has increased stability and decreased sublimation. Because this fuel pellet has been cooled at a specific rate to a specific dimension, there is a constant dominant resonant frequency that can be employed to readily initiate the entropy burst of the TAP fuel pellet. In the alternative the TAP fuel pellet may also be caused to EB via thermal and mechanical shock. This shock would be supplied by combusting the minor EB gases, ethane and methyl acetate, to produce superheated water. The superheated water injection upon the fuel pellet would subject the fuel pellet to sufficient mechanical and thermal shock (MTS) to initiate the EB. Depending on the required speed of the generator both bust initiation alternatives may be used in conjunction to reduce burst onset lag time.

The TAP fuel pellets are stored in a cryogenic chamber capable of being rapidly flooded with a copper/water solution should problems arise. The copper/water solution will nullify the TAP reactive potential. From storage, the TAP pellets are injected into the gas expansion chamber of the device to be driven.

The preferred embodiment of the combustion chamber is the combustion chamber of an opposed piston tubular linear generator (OPTLG), which are well known and need not be described in detail herein. However, it is worth noting that the major components of the OPTLG and reformation cycle include:

Opposed pistons reciprocally driven and translated linearly by the gas expansion of an ultrasonically or MTS initiated TAP fuel pellet entropy burst. The pistons are each directly connected to a translator, the equivalent of the rotor in a typical generator. The translator may be composed of permanent magnets or switched reluctance materials. The translator end opposite the EB piston is connected to a piston which travels in a gas spring bounce chamber. The end of the bounce chamber opposite this piston is partially composed of coils which are a part of an absorption refrigeration system. This system is used to assist in cooling the TAP formation process and to freeze the TAP fuel pellet. These coils absorb the heat developed when the gas spring gas is compressed by the translation of the power expressed by the TAP EB.

The stator windings are leeched, the electrical output of each induction ring is continuously monitored so that the exact position of the translators, therefore the position of the piston faces, is constantly known. This allows management of the opposed piston transit by either increasing/decreasing the gas spring pressure or energizing subset winding in the stator to accelerate or decelerate the translator via magnetic force.

Once the EB has forced the opposed pistons apart and the gas spring begins to force the pistons to return to the starting position, the firing position, an exhaust valve is opened to allow the exhaust gases to exit the burst chamber. These gases are sent directly to a modified fractionating device to be partially condensed and separated. The ozone and H2O gas phase reactants are siphoned off into a separate vessel to react and form H2O2 (hydrogen peroxide), which is then cooled to a liquid state. The acetone that has been liquefied in the fractionating device is combined with the liquid H2O2 and is fed back into the TAP formation reactor along with additional acetone, H2O2, and H2O to reform new TAP pellets. The ethane and methyl acetate are removed from the modified fractionating device and are utilized in a combustion engine to produce power for operation of auxiliary devices The foregoing summary broadly sets out the more important features of the present invention so that the detailed description that follows may be better understood, and so that the present contributions to the art may be better appreciated. There are additional features of the invention that will be described in the detailed description of the preferred embodiments of the invention which will form the subject matter of the claims included in this and any successor applications claiming the benefit of the filing date of the instant application.

BRIEF DESCRIPTION OF SEVERAL VIEWS OF THE DRAWINGS

The invention will be better understood and objects other than those set forth above will become apparent when consideration is given to the following detailed description thereof. Such description makes reference to the annexed drawings wherein:

FIG. 1 is block diagrammatic schematic illustration showing the inventive IES system.

DETAILED DESCRIPTION OF THE INVENTION

Referring now to FIG. 1, there is schematically illustrated in block diagrammatic form a preferred embodiment of the inventive IES. The system 10 preferably utilizes an opposed piston tubular linear generator ("OPTLG") to generate electrical power. However, the IES will work in all internal combustion engines or turbine engines. It is particularly well suited for use in Prandtl turbines, also known as boundary layer turbines or Tesla turbines. The illustration herein represents the IES formation, work production, and gas recovery of the "entropy burst" (EB) of triacetone triperoxide (TAP).

TAP formation component chemicals are stored at 12 acetone, hydrogen peroxide 14, and water 16. The acetone and hydrogen peroxide are metered into a temperature controlled polymerization reactor 13. Once acetone polymerization has occurred, the acetone/water solution is metered through the fixed bed acid catalyst reactor 18. This reactor is held at a constant temperature, pressure, and flow rate to achieve the shortest production timing of TAP crystallization while limiting the production of acetone peroxide monomers and dimers.

Once the TAP crystals form in the water bath, they are sent through a filter 20 for filtration down to a specific TAP/water percentage solution. Any excess water is returned to the water storage container 16. This water is metered back into the hydrogen peroxide container 14 to maintain the peroxide solution at 50%. The filtered TAP-water solution is then sent to the TAP fuel pellet production chamber 22.

Within the TAP fuel pellet freeze chamber 22, the TAP-water solution is quickly frozen at a specific heat extraction rate to a uniform fuel pellet size. Freezing of the liquid water initiates on the surface of the TAP crystals. The water crystals bond to the TAP substrate in a very uniform arrangement reliably extending formation of the TAP crystalline structure for several nanometers into the water crystal matrix. This bond creates a crystalline support structure encasing the TAP crystals. This crystalline support structure effectively stabilizes the TAP crystals and halts TAP sublimation. Because the TAP fuel pellet has been formed at a specific heat extraction rate to a specifically dimensioned fuel pellet, as determined by the size and type of motive device to be driven, the TAP fuel pellet has a dominant resonant frequency. Typical ice formation is an amalgam of differing crystal sizes, each having a different potential resonate frequency. Crystal size is generally determined by the contaminates in the water matrix and by the rate of freezing. Having only one contaminate (i.e., TAP) and controlling a rapid heat extraction rate for a specifically sized fuel pellet, a dominate resonate frequency will develop mimicking the resonate frequency of TAP crystal. Harmonics of this frequency will be implemented acoustically through ultrasound to initiate the TAP EB, in conjunction with or without MTS.

From the freeze chamber 22, the TAP fuel pellets are sent to cold fuel pellet storage 24. The storage chamber is in fluid communication with a copper/water ("cupric") water solution bath 26 held at 150° F. If problems arise within the IES, the cupric solution is flooded into the TAP fuel pellet storage chamber. The cupric solution will rapidly dissolve the TAP fuel pellet and remove the risk of explosion. The fuel pellet storage is fitted with electric heaters to compensate for heat loss from the cupric solution into the TAP fuel pellets.

The TAP fuel pellets are next fed into the burst chamber 28 of the OPTLG 30. The EB of the TAP fuel pellet is initiated by an ultrasound device 32, with or without MTS, providing the dominant resonant frequency harmonics to the burst chamber 28. The shockwave and gas expansion of the TAP entropy burst creates very high pressure in the initial confinement of the burst chamber 28. The shockwave first reacts with the crystalline structure of the ice to stress the hydrogen bond of the water molecule matrix due to the extreme temperature and pressure within the shockwave lens. This sudden pressure and relaxation after the shockwave passes, hundreds of times before the blast wave moves forward, subjects the "brittle" (due to crystallization) hydrogen bond into separation. The bulk pressure developed from the blast wave provides sufficient pressure to elevate the temperature of the burst chamber to phase change the water into superheated steam. This superheated steam forces the burst chamber pistons 34 in the burst chamber 28 apart. The burst chamber pistons 34 are the inner part of the opposed piston translator 36 assemblies, which also include the bounce chamber pistons 38 disposed in the opposing bounce chambers 40. The translator performs the same function as the rotor of a typical rotary generator, the creation of magnetically induced induction in the winding 42. The translator is preferably a permanent magnet, but may also be laminations of metalglas, similar amorphous steel material for use in a switched reluctance device or other appropriate materials.

As the forces acting on the bust chamber pistons drive the translator assemblies apart the magnetic fields generated by the translator, translate across the copper field windings 42 inducing electrical current in the windings. Additionally, the bounce chamber pistons compress the bounce chamber gas, thereby increasing the temperature and pressure in the bounce chamber. The compression ratio is calculated to produce a compression heat in excess of 300° F. and is used as a heat source for an absorption refrigeration unit 44. This unit acts in conjunction with auxiliary refrigeration units 46 to cool, freeze, and cold store the TAP production.

The bounce chamber gas spring response time is managed to affect synchronous transit timing of the two opposed pistons. The bounce chamber bounce gas pressure can be increased by the addition of gas from a bounce chamber gas storage unit 48 or decreased by engaging the bounce chamber pump 50 to remove gas from the chamber and return it to the bounce chamber storage unit. Additionally, the generator windings are constantly monitored to interpret the exact position of the translator. If either of the translators requires micro repositioning to ensure synchronistic movement, electrical circuits auxiliary to the stator winding can be energized to effect magnetic force on the permanent magnets of the translator to either accelerate or decelerate as required. Once the translator assemblies have reached maximum compression of the bounce chamber gas and begin to reverse direction, a port opens in the burst chamber to allow the EB gases to flow into the fractionating device 52.

The modified fractionating device has trays to cool the acetone and hydrogen peroxide returned from the H2O and O3 gas reaction chamber. This reaction chamber pathway will produce gas phase hydrogen peroxide ("H2O2"). This gas phase H2O2 along with the gas phase acetone produced in the EB will be collected on condensation trays in the fractionating reactor and returned to their respective storage containers, 12, 14. The minor gases produced in the burst reaction (i.e., ethane and methyl acetate) will be collected from the modified fractionating device and sent to a combustion engine to run a refrigeration compressor and/or produce superheated water as the particular generator type will dictate.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

I claim:

1. A method of generating electricity, comprising:
providing a reciprocating, internal combustion engine having a burst chamber and at least one burst chamber piston mounted for reciprocation within said burst chamber;
providing said at least one burst chamber piston with a magnetic material portion;
providing coils around said at least one burst chamber piston for generating electricity when said magnetic material portion reciprocates within said coils;
entropy bursting triacetone triperoxide ("TAP") within said burst chamber to cause said at least one burst chamber piston to move away from said triacetone triperoxide entropy burst;
generating electricity as said magnetic material portion moves relative to said coils;
said entropy burst of said TAP producing acetone and ozone as byproducts of the burst,
siphoning said acetone and said ozone from said burst chamber and separating said acetone and said ozone from each other;
reacting said siphoned ozone with H2O gas to form hydrogen peroxide, which is then cooled to a first liquid hydrogen peroxide supply;
combining said siphoned acetone with the first liquid hydrogen peroxide supply and H2O in a TAP formation reactor to form TAP pellets;
feeding said TAP pellets to said burst chamber and entropy bursting said TAP.

2. The method of claim 1, wherein said TAP is a crystalline solid sublimates to a gas on entropy burst within said burst chamber.

3. The method of claim 1, wherein an external supply of acetone and an external supply of hydrogen peroxide are mixed with said siphoned acetone and said first hydrogen peroxide supply to replace TAP bursted in said entropy burst.

4. The method of claim 1, further comprising:
providing a bounce chamber piston connected to said at least one burst chamber piston;
providing a bounce chamber defined in said internal combustion engine;
providing heat coils at an end of said internal chamber opposite said burst chamber;

wherein said movement of said at least one burst chamber piston away from said TAP entropy burst causes said bounce chamber piston to compress gas in said bounce chamber to retard motion of said bounce chamber piston; and wherein said heat coils absorb heat produced when said bounce chamber gas is compressed by transferring the produced heat to a refrigerant within said heat coils.

5. The method of claim 1, wherein said TAP is entropy bursted by vibrating said TAP.

6. A method of generating electricity, comprising:
providing a reciprocating, internal combustion engine having a burst chamber and at least one burst chamber piston mounted for reciprocation within said burst chamber;
providing said at least one burst chamber piston with a magnetic material portion;
providing coils around said at least one burst chamber piston for generating electricity when said magnetic material portion reciprocates within said coils;
entropy bursting triacetone triperoxide ("TAP") within said burst chamber to cause said at least one burst chamber piston to move away from said triacetone triperoxide entropy burst;
generating electricity as said magnetic material portion moves relative to said coils;
said entropy burst producing ethane and methyl acetate as byproducts of the TAP burst in a first internal engine combustion cycle;
combusting in a second internal combustion cycle the ethane and the methyl acetate from the first internal combustion cycle to produce superheated water; and
injecting said superheated water onto TAP fuel pellets to cause said TAP fuel pellets to entropy burst to drive said internal combustion engine.

7. A method of generating electricity, comprising:
providing a reciprocating, internal combustion engine having a burst chamber and at least one burst chamber piston mounted for reciprocation within said burst chamber;
providing said at least one burst chamber piston with a magnetic material portion;
providing coils around said at least one burst chamber piston for generating electricity when said magnetic material portion reciprocates within said coils;
entropy bursting triacetone triperoxide ("TAP") within said burst chamber to cause said at least one burst chamber piston to move away from said triacetone triperoxide entropy burst; and
generating electricity as said magnetic material portion moves relative to said coils;
wherein said TAP is produced by combining acetone and hydrogen peroxide in a temperature controlled polymerization reactor to form an acetone-water solution; the acetone-water solution is then fed through a fixed bed acid catalyst reactor held at a constant temperature, pressure, and flow rate to form solid TAP crystals in a water solution, said TAP crystals are then filtered to remove water and cooled at a specific rate to form a frozen TAP fuel pellet.

8. A method of generating electricity, comprising:
providing a reciprocating, internal combustion engine having a burst chamber and at least one burst chamber piston mounted for reciprocation within said burst chamber;
providing said at least one burst chamber piston with a magnetic material portion;
providing coils around said at least one burst chamber piston for generating electricity when said magnetic material portion reciprocates within said coils;
entropy bursting triacetone triperoxide ("TAP") within said burst chamber to cause said at least one burst chamber piston to move away from said triacetone triperoxide entropy burst; and
generating electricity as said magnetic material portion moves relative to said coils;
wherein said TAP is stored in a cryogenic chamber prior to being fed into said burst chamber, and wherein a copper/water solution is provided in selective communication with said cryogenic chamber so that the chamber can be flooded to prevent entropy burst of the TAP.

9. The method of claim 1, wherein there are two burst chamber pistons mounted 180 degrees apart from each other.

10. The method of claim 1, wherein the at least one burst chamber piston is connected to the bounce chamber by a translator.

11. The method of claim 10, wherein said translator carries said magnetic material.

12. The method of claim 11, wherein said translator magnetic portion is a permanent magnet.

13. The method of claim 11, wherein said translator magnetic portion is formed of switched reluctance materials.

14. A method of generating electricity, comprising:
providing a reciprocating, internal combustion engine having a burst chamber and a first and second burst chamber piston mounted for reciprocation within said burst chamber;
providing said first burst chamber piston with a first bounce piston and a first translator connecting said first burst chamber piston to said first bounce chamber piston;
providing said second burst chamber piston with a second bounce piston and a second translator connecting said second burst chamber piston to said second bounce chamber piston;
entropy bursting a first quantity of triacetone triperoxide ("TAP") fuel pellets within said burst chamber to cause said first and second burst chamber pistons to move away from said triacetone triperoxide entropy burst;
producing acetone and ozone during said entropy burst of said first quantity of TAP;
siphoning said acetone and said ozone from said burst chamber and separating said acetone and said ozone from each other;
reacting said siphoned ozone with H2O gas to form a first liquid hydrogen peroxide supply;
combining said siphoned acetone with the first liquid hydrogen peroxide supply and H2O in a TAP formation reactor to form TAP pellets; and
feeding said TAP pellets into said burst chamber for entropy burst.

15. A method of generating electricity, comprising:
providing a reciprocating, internal combustion engine having a burst chamber and a first and second burst chamber piston mounted for reciprocation within said burst chamber;
providing said first burst chamber piston with a first bounce piston and a first translator connecting said first burst chamber piston to said first bounce chamber piston;
providing said second burst chamber piston with a second bounce piston and a second translator connecting said second burst chamber piston to said second bounce chamber piston;
entropy bursting a first quantity of triacetone triperoxide ("TAP") fuel pellets within said burst chamber to cause said first and second burst chamber pistons to move away from said triacetone triperoxide entropy burst;

producing acetone and ozone during said entropy burst of said first quantity of TAP;

siphoning said acetone and said ozone from said burst chamber and separating said acetone and said ozone from each other;

reacting said siphoned ozone with H2O gas to form a first liquid hydrogen peroxide supply;

combining said siphoned acetone with the first liquid hydrogen peroxide supply and H2O and adding an additional external supply of acetone and an external supply of hydrogen peroxide in a TAP formation reactor to form TAP pellets in an amount at least equal to the first quantity of TAP fuel pellets entropy burst; and feeding said TAP pellets into said burst chamber for entropy burst.

16. A method of generating electricity, comprising:

providing a reciprocating, internal combustion engine having a burst chamber and a first and second burst chamber piston mounted for reciprocation within said burst chamber;

providing said first burst chamber piston with a first bounce piston and a first translator connecting said first burst chamber piston to said first bounce chamber piston;

providing said second burst chamber piston with a second bounce piston and a second translator connecting said second burst chamber piston to said second bounce chamber piston; and entropy bursting a first quantity of triacetone triperoxide ("TAP") fuel pellets within said burst chamber to cause said first and second burst chamber pistons to move away from said triacetone triperoxide entropy burst;

wherein said TAP fuel pellets are stored in a cryogenic chamber prior to being fed into said burst chamber, and wherein a copper/water solution is provided in selective communication with said cryogenic chamber so that the chamber can be flooded to prevent entropy burst of the TAP fuel pellets.

17. The method of claim 14, wherein said TAP fuel pellets are entropy bursted by vibrating said TAP.

* * * * *